March 28, 1961 E. R. McCARTEN 2,977,172
SELF LEVELING STORING AND DISPENSING APPARATUS
Filed April 7, 1959

INVENTOR
Edward R. McCarten
BY
Tennes J. Erstad
ATTORNEY

United States Patent Office 2,977,172
Patented Mar. 28, 1961

2,977,172
SELF LEVELING STORING AND DISPENSING APPARATUS

Edward R. McCarten, Port Chester, N.Y., assignor to American Machinery and Foundry Company, a corporation of New York Filed Apr. 7, 1959, Ser. No. 804,794
7 Claims. (Cl. 312—71)

This invention relates to self leveling storing and dispensing apparatus such as that shown in U.S. Patent 2,609,265 granted September 2, 1952 to Carl H. Larsen.

Devices of this type find wide application in many fields such as restaurants, cafeterias and industry, where they may be employed for articles such as dishes, work in process, etc., which they store and automatically dispense at a convenient height.

It has been found in this type of dispenser that there is an occasional tendency for the self-leveling mechanism to get out of adjustment.

In apparatuses of this type means are provided for fixing the upper level at which articles are positioned. While various means can be employed for this purpose, it has been found that a convenient way for doing this is by means of a screw having a knob at the bottom which can be turned to adjust the dispensing height of the articles stored in the apparatus. It has been found that in operation the carrier or the support, which is positioned up and down by the screw, tends to move up and down on this screw during the operation and use of dispensing apparatus so that the dispensing height is changed. This is objectionable and various attempts have been made to remedy this. But such attempts have required changing the structure of the dispenser housing materially, and this in turn has increased the cost of the unit or has made it more difficult to keep it clean.

It is an object of this invention to provide means which will be extremely simple in construction, for maintaining the spring support of a self leveling dispenser free from rotary movement.

Another object of this invention is to provide a spring support which will be easier to clean, simple to manufacture and which will not necessitate any material change in the construction of the self leveling dispenser.

Still another object of the invention is to provide such a device which is foolproof and reliable in operation.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
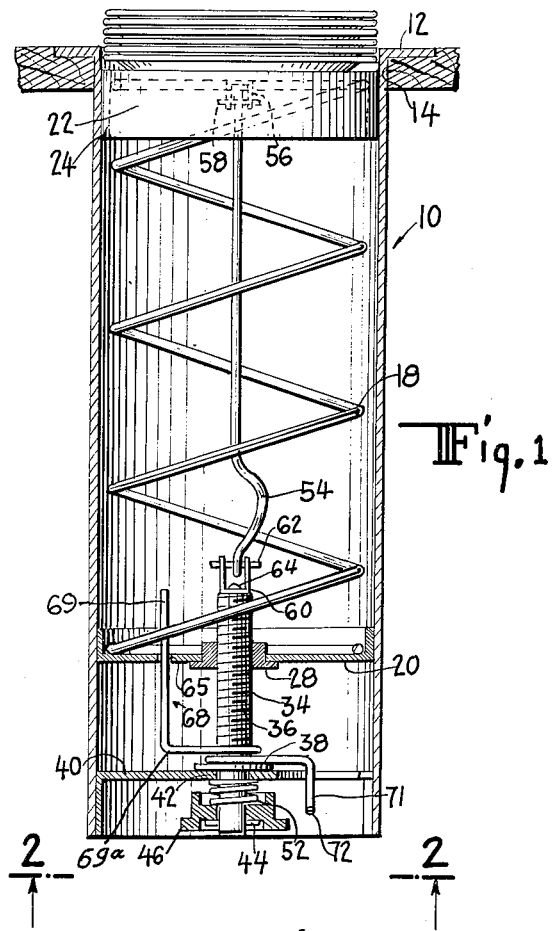
Fig. 1 is a sectional side elevation of the self leveling storing and dispensing apparatus showing the mechanism employed.
Figure 2:
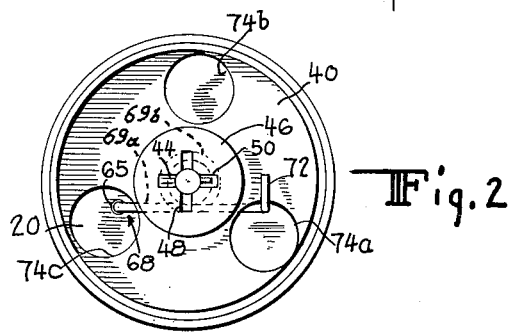
Fig. 2 is a plan view of the base portion of the device viewed in the direction of the arrows 2—2.

Referring now to the drawings in detail there is shown in Fig. 1 a housing 10 which is provided with a flange 12 for supporting the unit through opening 14, formed in a conventional counter.

A calibrated spring 18, which may be of a type similar to that disclosed in U.S. Patent 2,426,995 granted to W. J. Gibbs on September 9, 1947 and 2,609,265 mentioned hereinbefore, granted to Carl H. Larsen on September 2, 1952, is mounted in the cylindrical housing 10 and is supported at its lower end by a spring supporting plate 20. At the upper end, the spring 18 supports a carrier 22 having a skirted section 24 acting as a guide along the inner side of the cylindrical housing 10. The spring supporting plate 20 is provided with an interiorly threaded central flange 28. A vertical post 34 having a threaded portion 36 engages with the threaded hole in the center portion of supporting member 28. Another flange 38 is secured to the bottom portion of the post, and rests on the top of supporting plate 40.

The center of the supporting plate is provided with a hole 42 which permits the post 34 to extend therethrough. At the bottom of the post 34 is mounted a pin 44 which extends laterally from the post 34. A locking knob 46 having a slot 48 and an indentation 50 which coacts with the pin 44 is inserted over the post 34 and turned so as to bring the indentation 50 into contact with the pin 44. A compression spring 52 is provided to exert pressure between the supporting plate 40 and the adjusting knob 46 so as to maintain the pin 44 in engagement with the indentation 50. The supporting plate 40 is secured to the bottom of the tubular member 10 by suitable means such as welding or riveting.

A cable 54 is connected at its upper end to a bracket 56 carried by the carrier 22 by means of a pin 58. The lower end of chain or cable 54 is connected to a swivel bracket 60 by means of a pin 62. The bracket 60 is loosely connected to the post 36 by means of a screw 64. The cable 54 therefore limits the extent to which the carrier 22 can move upwardly when the unit is empty which in most instances is the level of the counter in which the unit is mounted.

The operation of the device is fully described in U.S. Patent 2,609,265 granted to Carl H. Larsen on September 2, 1952.

In order, however, to prevent the spring supporting structure, which may be a flat steel plate 20 from rotating during the upward or downward movement of carrier 22 there is provided a rod 68 formed with a vertical portion 69 extending through a hole 65 in spring supporting plate 20, a horizontal portion 69a formed with a circular loop 69b which fits freely over post 34 and downwardly extending leg 71 having an extension 72. The downwardly bent portion 71 is inserted into any of the holes 74a, 74b or 74c in the fixed supporting base 40. These holes limit the lateral travel of the rod 68 and thereby prevent the rotation of spring supporting plate 20 while allowing the spring support to be adjusted up and down. Also this arrangement permits the ready removal for cleaning and maintenance of the supporting plate 20, spring 18 and carrier 22 from housing 10, by the simple disconnecting of cable 18 from bracket 56 of the carrier.

While rod 68 has been described and illustrated as being of L-shape, it will be readily understood according to the broad concept of the invention, that other lateral travel restricting means may be employed, which essentially consist of a vertical guide extending through the hole 65 in the spring supporting plate 20 to permit up and down adjustment of the spring support and in fixed engagement with supporting base 40.

The invention above described may be varied in construction within the scope of the claims, for the particular device selected to illustrate the invention is but one of many possible embodiments of the same. The invention therefore is not to be restricted to the precise details of the structure shown and described.

What is claimed is:

1. In an apparatus of a self leveling type, in combination, a housing having a fixed bottom member, a spring support, a calibrated compression spring supported thereon, a material carrier mounted on said compression spring, a threaded vertical post turnably secured in said housing for raising and lowering said spring support, and guide means in engagement with said fixed bottom member and said spring support to prevent the lateral displacement of the latter.

2. In an apparatus of a self leveling type, in combination, a housing, having a bottom portion, a spring support, having an eccentrical opening, a calibrated compression spring supported thereon, a material carrier mounted on said compression spring, a supporting base fixedly secured to the bottom portion of said housing and provided with at least one eccentrically located aperture, a vertically extending guide member engaging with said opening and said aperture for preventing the lateral displacement of said spring support, and a threaded vertical post turnably secured to said supporting base and cooperating with said spring support to permit the upward and downward adjustment of the latter.

3. The combination according to claim 2, wherein said guide member is substantially L-shaped and formed with a vertical portion adapted to extend through the opening in said spring support member, a horizontal portion formed with a circular loop slidable over said post, said horizontal portion terminating in a downwardly bent portion adapted to engage with said aperture.

4. In an apparatus of the self leveling type, which is provided with a spring-operated material support, and a housing therefor, a supporting base fixedly secured to the housing and provided with an eccentrically disposed opening, a spring-supporting plate provided with an eccentrically disposed aperture, a guide post centrally secured to said base and adjustably extending through the center of said spring-supporting plate, and a vertically extending guide member engaging with said aperture and said opening for preventing the lateral displacement of said spring-supporting plate.

5. In an apparatus according to claim 4, said guide member being L-shaped and formed with an upwardly extending vertical portion for engaging said aperture, a horizontal portion formed with a circular loop slidable over said guide post, said horizontal portion terminating in a downwardly bent portion adopted to engage with the opening of said fixedly secured supporting base, to prevent the lateral displacement of said spring-supporting plate.

6. Self leveling storing and dispensing apparatus comprising a cylindrical housnig, a carrier for supporting material mounted for free up and down movement in said housing, a spring support mounted for up and down movement at the lower end of said housing, a calibrated compression spring interposed between said material support platform and said spring support for maintaining the material in said dispenser at a constant level, a rod vertically extending through said spring support, means for supporting said rod in vertical position and an extension formed at the lower end of said rod and stop means in said housing engaging with said extension to prevent lateral movement between the rod and said housing.

7. A self leveling storing and dispensing apparatus comprising a cylindrical housing having a stationary bottom part, a cylindrical carrier for supporting material for free up and down movement in said housing, a spring support, an adjusting screw for adjusting said spring support up and down relative to said housing, a calibrated counterbalancing spring positioned between said material supporting carrier and said spring support to counterbalance the weight of the material carried on said carrier so as maintain the top of the material at a constant level regardless of what the material is added to or removed from that supported on the carrier, a vertically extended rod extending through said spring support for a distance covering the entire range of travel of said spring support, a loop formed at the lower end of said rod through which the adjusting screw for the spring support extends, and an extension formed on said rod for engaging with the stationary bottom part of said housing to prevent the vertically extended rod from moving relative to said housing.

References Cited in the file of this patent

UNITED STATES PATENTS

| | | |
|---|---|---|
| 2,251,876 | Gibbs | Aug. 5, 1941 |
| 2,609,265 | Larsen | Sept. 2, 1952 |
| 2,812,990 | Smith | Nov. 12, 1957 |
| 2,883,251 | Bosque | Apr. 21, 1959 |

FOREIGN PATENTS

| | | |
|---|---|---|
| 707,807 | Great Britain | Apr. 21, 1954 |
| 786,996 | Great Britain | Nov. 27, 1957 |